(12) United States Patent
Shigeta

(10) Patent No.: US 9,754,547 B2
(45) Date of Patent: Sep. 5, 2017

(54) DISPLAY APPARATUS

(71) Applicant: Sakai Display Products Corporation, Sakai-shi, Osaka (JP)

(72) Inventor: Mitsuhiro Shigeta, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 105 days.

(21) Appl. No.: 14/770,298

(22) PCT Filed: May 27, 2014

(86) PCT No.: PCT/JP2014/064009
§ 371 (c)(1),
(2) Date: Aug. 25, 2015

(87) PCT Pub. No.: WO2014/192763
PCT Pub. Date: Dec. 4, 2014

(65) Prior Publication Data
US 2016/0012793 A1 Jan. 14, 2016

(30) Foreign Application Priority Data

May 29, 2013 (JP) .................................. 2013-113369

(51) Int. Cl.
*G09G 3/36* (2006.01)
*G02F 1/1362* (2006.01)

(52) U.S. Cl.
CPC ..... *G09G 3/3655* (2013.01); *G02F 1/136213* (2013.01); *G02F 1/136286* (2013.01);
(Continued)

(58) Field of Classification Search
CPC ............... G09G 3/3655; G09G 3/3614; G09G 2300/0876; G09G 2320/0252;
(Continued)

(56) References Cited

U.S. PATENT DOCUMENTS

2006/0290848 A1* 12/2006 Choi ................. G02F 1/133555
349/114
2012/0086743 A1* 4/2012 Shiomi ............. G02F 1/136213
345/694
2013/0321367 A1* 12/2013 Kuwabara ............ G09G 3/3655
345/205

FOREIGN PATENT DOCUMENTS

JP      H09-16128 A     1/1997
JP   2003-150127 A  *  5/2003
(Continued)

*Primary Examiner* — Sanjiv D Patel
(74) *Attorney, Agent, or Firm* — Rudy J. Ng; Bret E. Field; Bozicevic, Field & Francis LLP

(57) ABSTRACT

A display apparatus includes a plurality of display elements, signal lines which supply a signal voltage to be applied to the display elements, switching elements which are provided corresponding to each of the display elements and are configured to control conduction/non-conduction between the display elements and the signal lines by opening and closing, scanning lines configured to supply a control voltage to control the opening and closing of the switching elements, a plurality of auxiliary capacitor parts connected to each of the display elements, main wirings configured to supply a voltage to be applied to the auxiliary capacitor parts, one or a plurality of sub-wirings electro-statically coupled to the main wirings and a unit configured to apply the voltage to be applied to the auxiliary capacitor parts to the main wirings, and apply a voltage having a polarity reverse to that of the voltage to the one or plurality of sub-wirings.

5 Claims, 8 Drawing Sheets

(52) U.S. Cl.
CPC ... G09G 3/3614 (2013.01); *G09G 2300/0823* (2013.01); *G09G 2300/0876* (2013.01); *G09G 2320/0252* (2013.01)

(58) Field of Classification Search
CPC .............. G09G 3/3648; G09G 3/3688; G09G 2300/0426; G09G 2310/08; G09G 2340/16; G09G 2310/0251; G09G 3/2014; G09G 2310/066; G09G 2300/08; G09G 2310/06; G09G 1/04; G09G 2300/0452; G09G 2310/0291; G09G 2310/0294; G02F 1/13338; G02F 1/1362; G02F 1/136213; G02F 1/136227
See application file for complete search history.

(56) References Cited

FOREIGN PATENT DOCUMENTS

| | | |
|---|---|---|
| JP | 2003-150127 A | 5/2003 |
| JP | 2006-235593 A | 9/2006 |
| WO | WO2010143348 A1 | 12/2010 |

\* cited by examiner

VOLTAGE WAVEFORM JUST AFTER OUTPUTTING

VOLTAGE WAVEFORM AT DISTANT PORTION

VOLTAGE WAVEFORM JUST AFTER OUTPUTTING

VOLTAGE WAVEFORM AT DISTANT PORTION

VOLTAGE WAVEFORM JUST AFTER OUTPUTTING

VOLTAGE WAVEFORM AT DISTANT PORTION

DISPLAY APPARATUS

CROSS-REFERENCE TO RELATED APPLICATIONS

This application is the national phase of PCT International Application No. PCT/JP2014/064009 which has an International filing date of May 27, 2014 and designated the United States of America.

FIELD

The present application relates to a display apparatus capable of supplying a substantially constant voltage to an auxiliary capacitor.

BACKGROUND

A liquid crystal display apparatus has been widely used for a computer display, a television receiving apparatus, an information display for displaying various information and the like. For example, an active matrix type liquid crystal display apparatus is configured to serve thin film transistors (TFTs) installed in each pixel as a switching element to apply a signal voltage (gradation voltage) to a pixel electrode within a period in which the switching element is turned on so as to control light transmittance in each pixel, thereby implementing a multi-gradation display with high definition without a crosstalk between pixels.

Generally, the liquid crystal display apparatus includes two transparent substrates made of a glass thin plate and a liquid crystal sealed between these substrates. One substrate (TFT substrate) is provided with the pixel electrode, the TFT, and the like in each pixel, and the other substrate (CF substrate) is provided with a color filter facing the pixel electrode and common electrodes (counter electrodes) which are common to each pixel.

The TFT substrate is provided with a plurality of gate wirings extending in a horizontal direction, and a plurality of source wirings extending in a vertical direction. Rectangular areas which are partitioned by these gate wirings and source wirings are a pixel area, respectively. Each pixel area is provided with the TFT which is the switching element and the pixel electrode. Further, the liquid crystal display apparatus includes a gate driver connected to the gate wiring and a source driver connected to the source wiring to control an image display in each pixel.

The source driver outputs display data to each source wiring at a timing synchronized with a data clock signal, within one horizontal synchronizing period. Meanwhile, the gate driver sequentially outputs scanning signals to the gate wirings at a timing synchronized with a gate clock signal, within one vertical synchronizing period. The TFT of the pixel connected to the gate wiring to which the scanning signal is supplied is turned on, and the display data supplied to the source wiring is written in the pixel electrode. Thereby, an orientation of liquid crystal molecules within the pixel is changed, and thus the light transmittance of the pixel is changed.

The display data are respectively written in each pixel within one vertical synchronizing period, and a desired image is displayed on the liquid crystal display apparatus.

SUMMARY

In recent years, a size the liquid crystal display apparatus is becoming larger. In a large liquid crystal display panel, manufacturing variations such as a line width and a film thickness of the TFT substrate occur in one liquid crystal display panel. As a result, when an image is displayed on a low-gradation raster screen, gradation variations due to variations such as electrical characteristics and capacitance of the TFT may occur in the surface of the liquid crystal display panel with a distribution. The occurred gradation variations are viewed as a partial luminance difference, that is, luminance unevenness in the surface of the liquid crystal display panel.

An example of the techniques for reducing the above-described gradation variations is disclosed in Japanese Patent Laid-open No. 2006-235593. This patent document discloses a technique for reducing the gradation variations by controlling the voltage applied to an auxiliary capacitor using a control circuit.

However, as the size of the liquid crystal display apparatus is becoming larger, a length of a wiring for applying the voltage to the auxiliary capacitor becomes longer, and a wiring resistance, or the like becomes larger. Therefore, a relatively large voltage drop occurs on a path through which the voltage is transmitted, and thereby, a pixel arranged near a driving circuit and a pixel separated from the driving circuit have difficulty to control the voltage applied to the auxiliary capacitor.

In consideration of the above-mentioned circumstances, it is an object of the present application to provide a display apparatus capable of applying a substantially constant voltage to auxiliary capacitors included in each pixel, even in a liquid crystal display apparatus including a plurality of pixels.

A display apparatus according to the present application includes a plurality of display elements, signal lines which supply a signal voltage to be applied to the display elements, switching elements which are provided corresponding to each of the display elements and are configured to control conduction/non-conduction between the display elements and the signal lines by opening and closing, scanning lines configured to supply a control voltage to control the opening and closing of the switching elements, a plurality of auxiliary capacitor parts connected to each of the display elements, main wirings configured to supply a voltage to be applied to the auxiliary capacitor parts, one or a plurality of sub-wirings electro-statically coupled to the main wirings and a unit configured to apply the voltage to be applied to the auxiliary capacitor parts to the main wirings, and apply a voltage having a polarity reverse to that of the voltage to the one or plurality of sub-wirings.

The display apparatus according to the present application, wherein the display element includes a plurality of sub-pixels, each of the sub-pixels in each of the display elements includes a switching element connected to one scanning line, the display element connected to the switching element, and the auxiliary capacitor part connected to the display element, and each of the auxiliary capacitor parts included in the sub-pixels in each of the display elements is provided with the main wirings and the sub-wirings.

The display apparatus according to the present application includes a first trunk line configured to supply the voltage to be applied to the auxiliary capacitor parts in each of the sub-pixels and a second trunk line configured to supply a voltage having a polarity reverse to that of the voltage, wherein one of the main wirings and the sub-wirings provided in each of the auxiliary capacitor parts included in each of the sub-pixels is connected to the first trunk line, and the other one thereof is connected to the second trunk line.

In the present application, each of the pixels supply a voltage to the auxiliary capacitor parts through the main wirings, and apply a voltage having a polarity reverse to that of the voltage to the sub-wirings electro-statically coupled to the main wirings. Thus the main wiring receives a charge from the sub-wiring, and a waveform of the voltage through the main wiring may be maintained.

According to the present application, it is possible to apply the substantially constant voltage to the auxiliary capacitors included in each pixel, even in the liquid crystal display apparatus including the plurality of pixels.

The above and further objects and features of the invention will more fully be apparent from the following detailed description with accompanying drawings.

DESCRIPTION OF EMBODIMENTS

Hereinafter, the present application will be described in detail with reference to the accompanying drawings illustrating the embodiments thereof.

Embodiment 1

Figure 1:
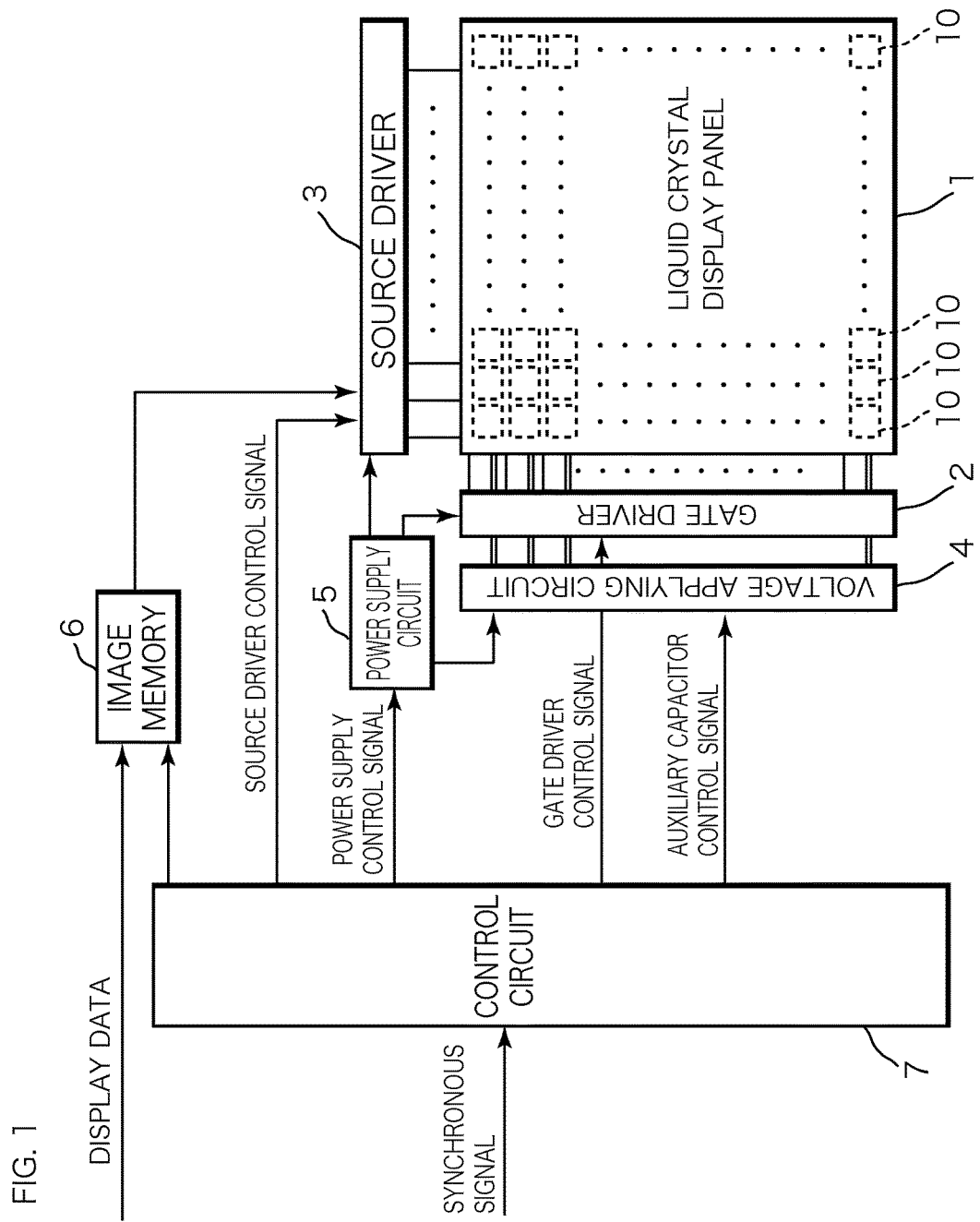
FIG. 1 is a view illustrating a schematic configuration of a display apparatus according to an embodiment of the present application.

FIG. 1 is a view illustrating a schematic configuration of a display apparatus according to an embodiment of the present application. The display apparatus according to the present embodiment is a liquid crystal display apparatus which includes, for example, a liquid crystal display panel 1, a gate driver 2, a source driver 3, a voltage applying circuit 4, a power supply circuit 5, an image memory 6, a control circuit 7 and the like.

Figure 2:
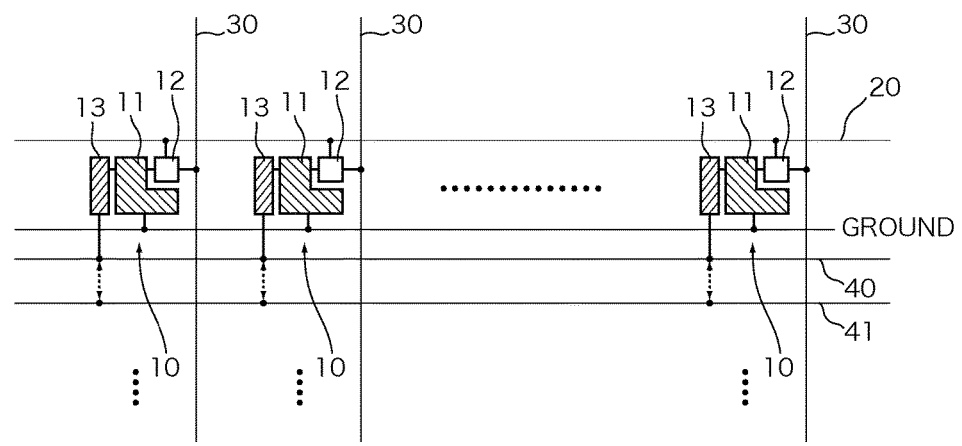
FIG. 2 is a schematic view illustrating the configuration of each pixel in a liquid crystal display panel.

The liquid crystal display panel 1 includes a plurality of pixels 10, 10, 10, . . . which includes display elements 11, switching elements 12, and auxiliary capacitor parts 13 (see FIG. 2). These pixels 10, 10, 10, . . . are disposed in a matrix shape (for example, 1024 number in a row direction and 768 numbers in a column direction) in the liquid crystal display panel 1.

Each pixel 10 of the liquid crystal display panel 1 includes a liquid crystal layer (not illustrated) which is sealed between a pixel electrode and a counter electrode. In the present embodiment, the counter electrode is grounded, and a voltage applied to the pixel electrode is controlled, and thus to control a voltage applied to the liquid crystal layer.

In this case, the control circuit 7 controls an operation of the display elements 11 and the switching elements 12 of each pixel 10 using a gate driver 2 and a source driver 3, and thus to control the voltage applied to the pixel electrode. The applied voltage to the pixel electrode is controlled, so as to control light transmittance of the liquid crystal layers in each pixel 10 and define display luminance of each pixel 10.

In order to control the voltage applied to the liquid crystal layers in each pixel 10, the control circuit 7 generates a memory control signal, a power supply control signal, an auxiliary capacitor control signal, a source driver control signal, and a gate driver control signal based on a synchronous signal input from the outside, and outputs each of the generated control signals to the image memory 6, the power supply circuit 5, the voltage applying circuit 4, the source driver 3, and the gate driver 2, respectively.

The image memory 6 temporarily stores input display data and outputs pixel data to be displayed on the liquid crystal display panel 1 to the source driver 3, in synchronization with the memory control signal input from the control circuit 7. Further, the image memory 6 may be embedded in the control circuit 7, and may be configured to output image data to the source driver 3 through internal processing of the control circuit 7.

Herein, the input synchronous signal and the display data are included in a signal acquired by A/D converting an LCD signal output from a CPU or an LCD control IC equipped in a mobile phone, a portable game machine, or the like and a CRT output signal of a personal computer (PC), a signal acquired by allowing the control circuit 7 to directly control a video RAM equipped in the PC and the like.

The power supply circuit 5 generates a driving voltage for the gate driver 2, a driving voltage for the source driver 3, and a driving voltage for the voltage applying circuit 4 in synchronization with the power supply control signal input from the control circuit 7, and outputs the generated driving voltage to the gate driver 2 and the source driver 3, respectively.

The gate driver 2 sequentially outputs a control voltage for controlling the switching elements 12 to be turned on/off in synchronization with the gate driver control signal input from the control circuit 7, to apply it to a gate wiring 20 (see FIG. 2, etc.) which is a scanning line.

The source driver 3 receives the pixel data output from the image memory 6 in synchronization with the source driver control signal input from the control circuit 7, and sequentially outputs a signal voltage depending on the pixel data. The signal voltage output from the source driver 3 is supplied to the display elements 11 of each pixel 10 through the source wirings 30 (see FIG. 2, etc.) which are the signal lines of the liquid crystal display panel 1, when the corresponding switching element 12 is turned on.

The voltage applying circuit 4 sequentially outputs the applied voltage to be applied to the auxiliary capacitor parts 13 in synchronization with the auxiliary capacitor control signal input from the control circuit 7, to supply it to the auxiliary capacitor parts 13 of each pixel 10 through an auxiliary capacitor main wiring 40 (see FIG. 2, etc.) to be described below.

Further, the voltage applying circuit 4 sequentially outputs a voltage having a polarity reverse to that of the applied voltage applied to the auxiliary capacitor main wiring 40 in synchronization with the auxiliary capacitor control signal input from the control circuit 7, to apply it to an auxiliary capacitor sub-wiring 41.

FIG. 2 is a schematic view illustrating a configuration of each pixel 10 in a liquid crystal display panel 1. As described above, the liquid crystal display panel 1 includes the plurality of pixels 10, 10, 10, . . . which are disposed in the matrix shape. FIG. 2 illustrates a portion of the pixels 10, 10, 10, . . . forming one row, for simplification.

The pixels 10, 10, 10, . . . forming one row are sequentially applied with a control voltage from the gate driver 2 through the gate wirings 20 which are formed to correspond to each row. During the control voltage from the gate driver 2 is applied to the switching element 12, the switching element 12 is turned on and the corresponding display element 11 is conducted to a source wiring 30. In this case, the signal voltage output from the source driver 3 is supplied to the display element 11 through the source wiring 30, thereby it is possible to apply a desired signal voltage to the display element 11.

Further, each pixel 10, 10, 10, . . . includes the auxiliary capacitor part 13 which is connected to the display element 11. The auxiliary capacitor parts 13, 13, 13, . . . of each row are supplied with the voltage applied from the voltage applying circuit 4 through the auxiliary capacitor main wirings 40 which are formed in each row. Further, Embodiment 1 includes the auxiliary capacitor sub-wiring 41 which is electro-statically coupled to the auxiliary capacitor main wiring 40, and is configured to apply the voltage having a polarity reverse to that of the applied voltage supplied from the auxiliary capacitor main wiring 40 to the auxiliary capacitor sub-wiring 41. These auxiliary capacitor main wirings 40 and auxiliary capacitor sub-wirings 41 are configured so as to form a balanced wiring.

Figure 3:
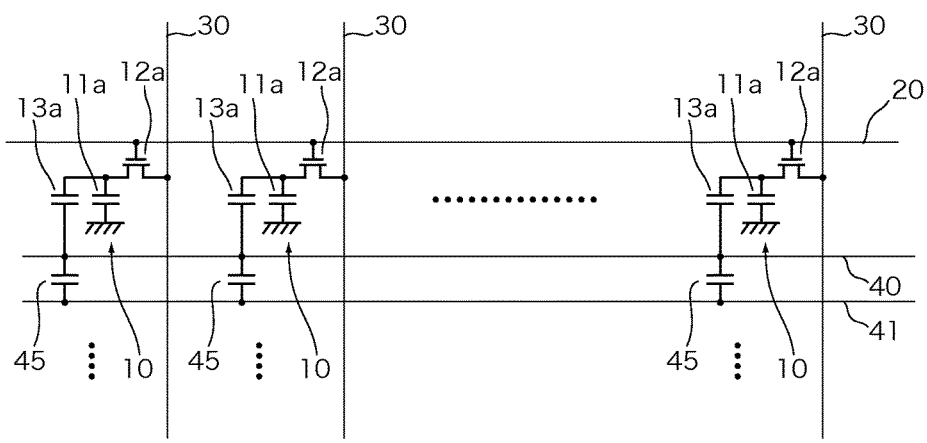
FIG. 3 is a schematic view illustrating equivalent circuits of each pixel.

FIG. 3 is a schematic view illustrating equivalent circuits of each pixel 10. In each pixel 10, the switching element 12 may be represented by, for example, a TFT 12a and the display element 11 may be represented as a liquid crystal capacitor 11a between the pixel electrode and the counter electrode. In addition, the auxiliary capacitor part 13 is represented as an auxiliary capacitor 13a in an equivalent circuit.

A gate terminal of the TFT 12a is connected to the gate wiring 20, and a source terminal of the TFT 12a is connected to the source wiring 30. A drain terminal of the TFT 12a is connected to one end side of the liquid crystal capacitor 11a, and the other end side (counter electrode) of the liquid crystal capacitor 11a is grounded. Further, in Embodiment 1, the auxiliary capacitor 13a is arranged in parallel to the liquid crystal capacitor 11a, and the auxiliary capacitors 13a, 13a, . . . in a row direction are connected to one auxiliary capacitor main wiring 40.

The TFT 12a is applied with the control voltage line-sequentially supplied from the gate driver 2 through the gate wiring 20, thereby being controlled to be turned on/off. The signal voltages supplied from the source driver 3 through each source wiring 30 are applied to the liquid crystal capacitors 11a within the turn on period of the TFTs 12a. By controlling a magnitude of the signal voltage, it is possible to control the light transmittance (display luminance of each pixel 10) of the liquid crystal layer in each pixel 10.

Further, in Embodiment 1, the applied voltage supplied from the voltage applying circuit 4 through the auxiliary capacitor main wiring 40 is applied to the auxiliary capacitor 13a which is connected to the auxiliary capacitor main wiring 40. The auxiliary capacitor main wiring 40 is connected with the auxiliary capacitor sub-wiring 41 by the electro-static coupling. The auxiliary capacitor sub-wiring 41 is applied with the voltage having a polarity reverse to that of the applied voltage supplied from the auxiliary capacitor main wiring 40, such that the auxiliary capacitor main wiring 40 may receive a charge flowed therein from the auxiliary capacitor sub-wiring 41 through a capacitor 45, and thus to hold a potential (voltage waveform) of the auxiliary capacitor main wiring 40.

Further, FIG. 3 illustrates the electro-static coupling of the auxiliary capacitor main wiring 40 with the auxiliary capacitor sub-wiring 41 as capacitive coupling, but these wirings may be coupled with each other by capacitance and resistance.

Hereinafter, the voltage waveform of the applied voltage supplied through the auxiliary capacitor main wiring 40 and the auxiliary capacitor sub-wiring 41 will be described.

Figure 4A:
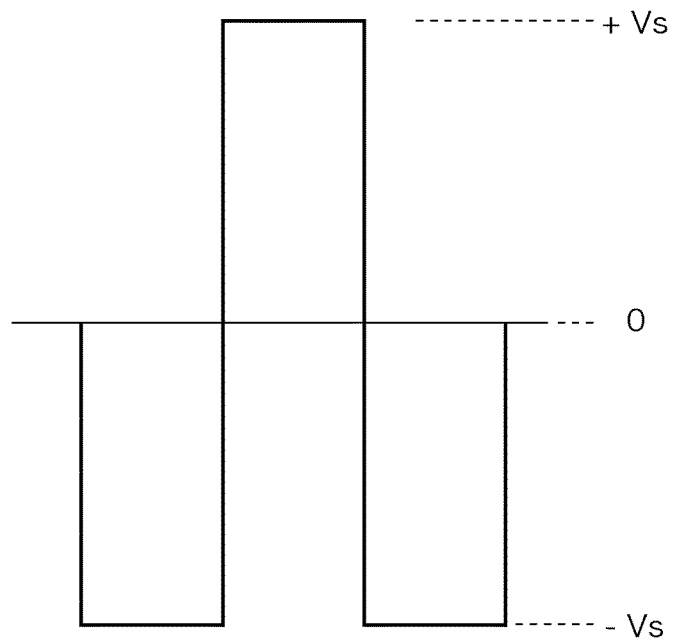
FIGS. 4A and 4B are a waveform view illustrating a voltage waveform of an applied voltage used in a conventional liquid crystal display panel.
Figure 4B:
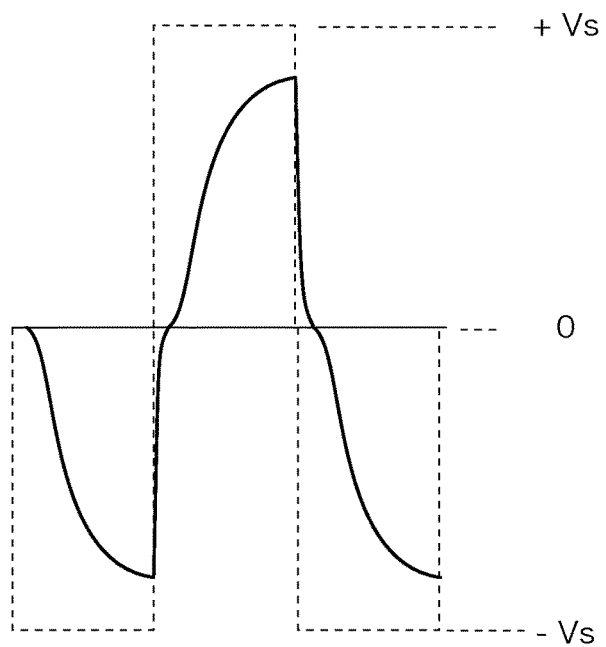

FIGS. 4A and 4B are a waveform view illustrating a voltage waveform of an applied voltage used in a conventional liquid crystal display panel. The applied voltage output from the voltage applying circuit to the auxiliary capacitor is, for example, an alternating voltage in which a voltage value of +Vs and a voltage value of −Vs are alternately switched as illustrated in FIG. 4A. The auxiliary capacitor located at a position with a short transmission distance of the signal from the voltage applying circuit is applied with a signal having substantially the same voltage waveform as the voltage waveform illustrated in FIG. 4A, without occurring a deterioration in waveform.

However, the signal having the voltage waveform is affected by resistance of a circuit, stray capacitance, and the like during the signal is transmitted through the wiring. As the transmission distance of the signal becomes longer, the resistance of the circuit, the influence of the stray capacitance, and the like may be increased, and therefore, the auxiliary capacitor located at a position separated from the voltage applying circuit may be applied with the applied voltage of which the waveform is distorted and the signal strength is reduced. Therefore, even when the applied voltage having a constant voltage waveform is output from the voltage applying circuit, a clear difference in the magnitude of applied voltage may occur between the auxiliary capacitor located at a position near the voltage applying circuit and the auxiliary capacitor located at a position separated from the voltage applying circuit.

Figure 5A:
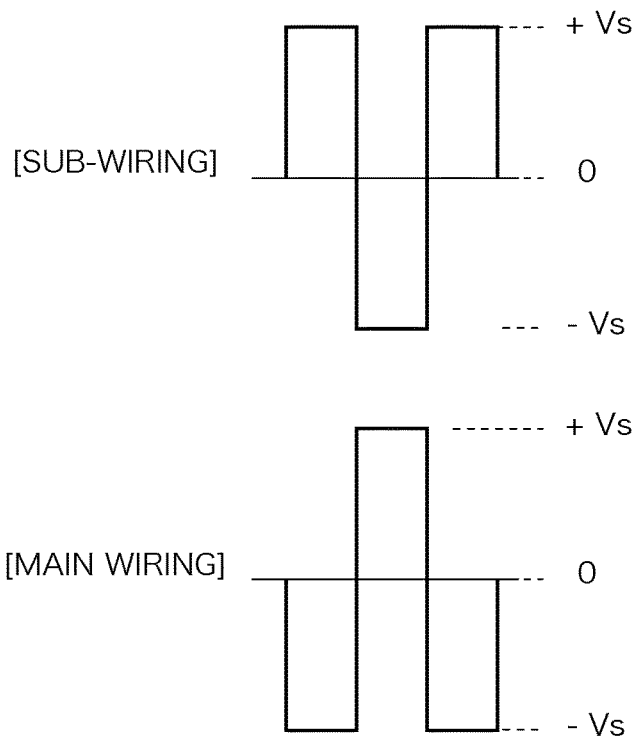
FIGS. 5A and 5B are a waveform view illustrating a voltage waveform of an applied voltage used in a liquid crystal display panel according to Embodiment 1.
Figure 5B:
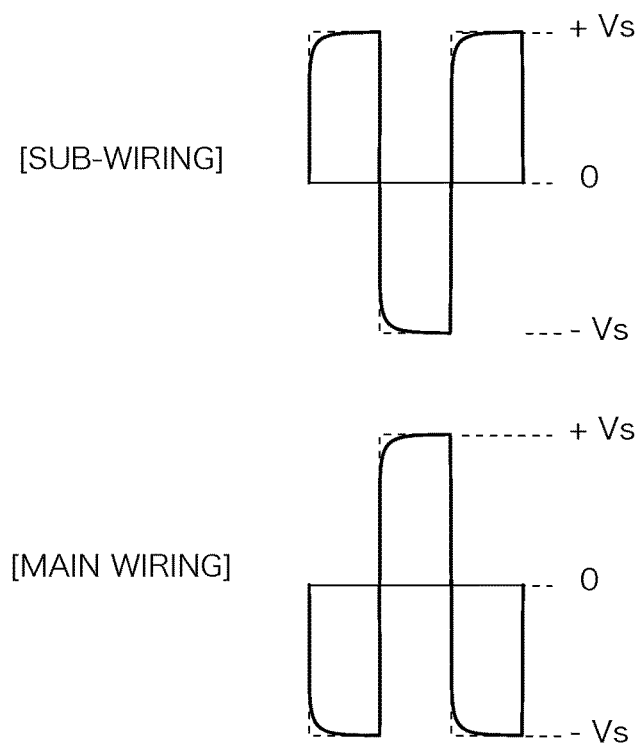

FIGS. 5A and 5B are a waveform view illustrating the voltage waveform of the applied voltage used in the liquid crystal display panel 1 according to Embodiment 1. The liquid crystal display panel 1 according to Embodiment 1 includes the auxiliary capacitor main wirings 40 and the auxiliary capacitor sub-wirings 41 which are electro-statically coupled in each row. Herein, the auxiliary capacitor main wiring 40 is applied with an applied voltage Vs to be applied to the auxiliary capacitor part 13 and the auxiliary capacitor sub-wiring 41 is applied with a voltage −Vs having a polarity reverse to that of the applied voltage Vs.

When the voltage applying circuit 4 makes the voltage waveform of the applied voltage supplied to the auxiliary capacitor main wiring 40 into a waveform as illustrated in a lower portion of FIG. 5A, the auxiliary capacitor sub-wiring 41 is applied with a voltage having a voltage waveform in which positive and negative polarities of the applied voltage supplied to the auxiliary capacitor main wiring 40 are inverted, as illustrated in an upper portion of FIG. 5A.

When the applied voltage having these voltage waveforms is applied to the auxiliary capacitor main wiring 40 and the auxiliary capacitor sub-wiring 41, respectively, the auxiliary capacitor main wiring 40 is operated to receive a charge flowed therein from the auxiliary capacitor sub-wiring 41 by the electro-static coupling, and thus to maintain the respective voltage waveforms. As a result, even in places separated from the voltage applying circuit 4, as illustrated in FIG. 5B, the distortion of the voltage waveform in the auxiliary capacitor main wiring 40 and the auxiliary capacitor sub-wiring 41 is decreased, and a decrease in signal strength is also suppressed.

Figure 6A:
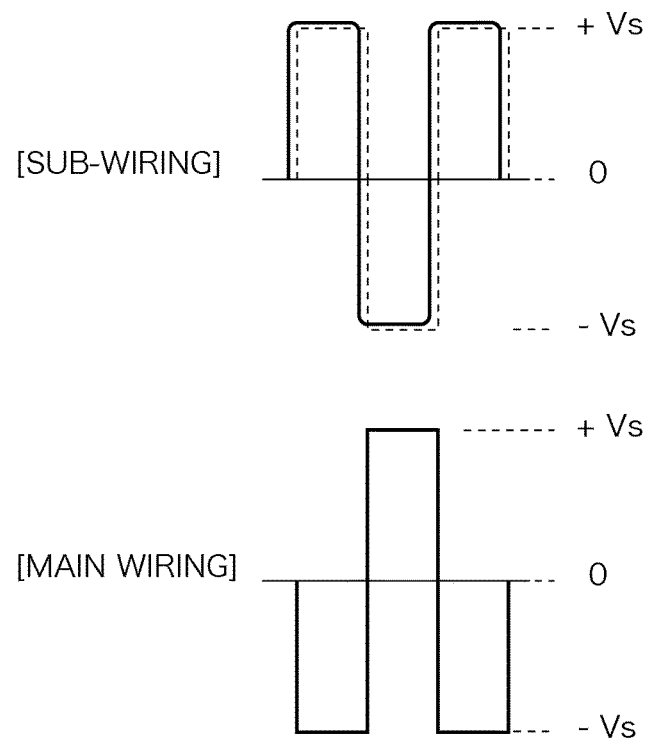
FIGS. 6A and 6B are a waveform view illustrating a modified example of the voltage waveform of the applied voltage.
Figure 6B:
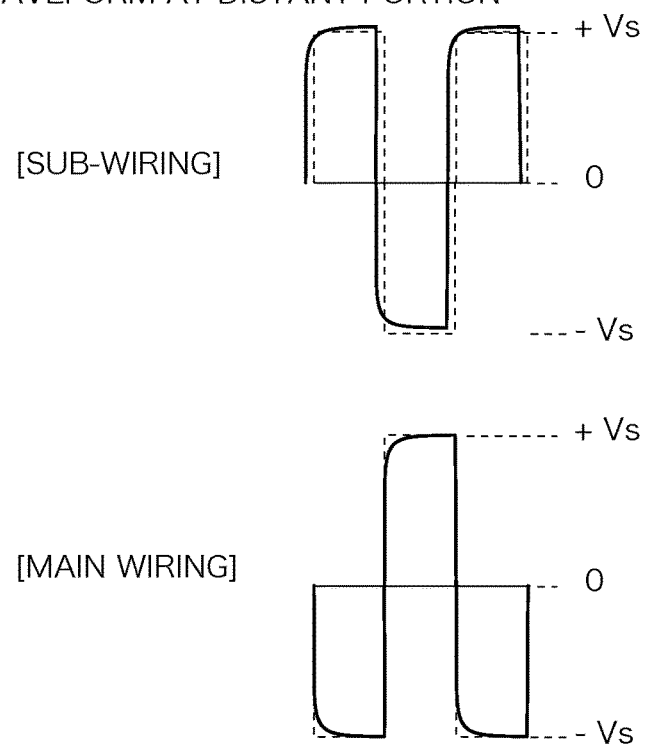

FIGS. 6A and 6B are a waveform view illustrating a modified example of the voltage waveform of the applied voltage. The example illustrated in FIGS. 5A and 5B are configured in such a way that the voltage in which the positive and negative polarities of the voltage waveform of the applied voltage supplied to the auxiliary capacitor main wiring 40 are inverted is applied to the auxiliary capacitor sub-wiring 41. However, the voltage having a polarity reverse to that of the control voltage supplied to the auxiliary capacitor main wiring 40 is applied to the auxiliary capacitor sub-wiring 41, thereby the auxiliary capacitor main wiring 40 is operated in such a way that a charge is flowed in from the auxiliary capacitor sub-wiring 41 by the electro-static coupling. Therefore, there is no need to completely invert the voltage waveform, including a phase and amplitude strength. For example, it is possible to configure in such a way that the applied voltage having the voltage waveform illustrated in the lower portion of FIG. 6A is applied to the auxiliary capacitor main wiring 40, and the applied voltage having the voltage waveform of which the phase and signal amplitude are only slightly different is applied to the auxiliary capacitor sub-wiring 41.

When the applied voltage having a reverse polarity is applied to the auxiliary capacitor main wiring 40 and the auxiliary capacitor sub-wiring 41 which are electro-statically coupled to each other, the auxiliary capacitor main wiring 40 is operated to receive a charge flowed therein from the auxiliary capacitor sub-wiring 41 by the electro-static coupling, and thus to maintain the respective voltage waveforms. As a result, even in places separated from the voltage applying circuit 4, as illustrated in FIG. 6B, the distortion of the voltage waveform in the auxiliary capacitor main wiring 40 and the auxiliary capacitor sub-wiring 41 is decreased, and a decrease in signal strength is also suppressed.

As described above, in Embodiment 1, even in the case in which the plurality of pixels 10, 10, 10, . . . are arranged in the row direction, the applied voltage having substantially the same voltage value as each other may be supplied to the auxiliary capacitor parts 13 which are included in each pixel 10. As a result, an appropriate voltage may be applied to each of the auxiliary capacitor parts 13 and excellent display quality may be achieved.

Further, Embodiment 1 describes the configuration in which one auxiliary capacitor sub-wiring 41 is coupled with one auxiliary capacitor main wiring 40 by the electro-static coupling, but a configuration in which the plurality of auxiliary capacitor sub-wirings 41, 41, . . . are coupled with one auxiliary capacitor main wiring 40 by the electro-static coupling may be allowed. In this case, the configuration in which the applied voltage having a polarity reverse to that of the applied voltage supplied from the auxiliary capacitor main wiring 40 is applied to each of the auxiliary capacitor sub-wiring 41 which is electro-statically coupled may be allowed.

Embodiment 2

Embodiment 1 has the configuration in which each pixel 10 includes the display element 11, the switching element 12, and the auxiliary capacitor part 13, respectively, but each pixel 10 may be configured to have a plurality of sub-pixels.

Embodiment 2 describes a configuration in which each pixel 10 includes two sub-pixels.

Figure 7:
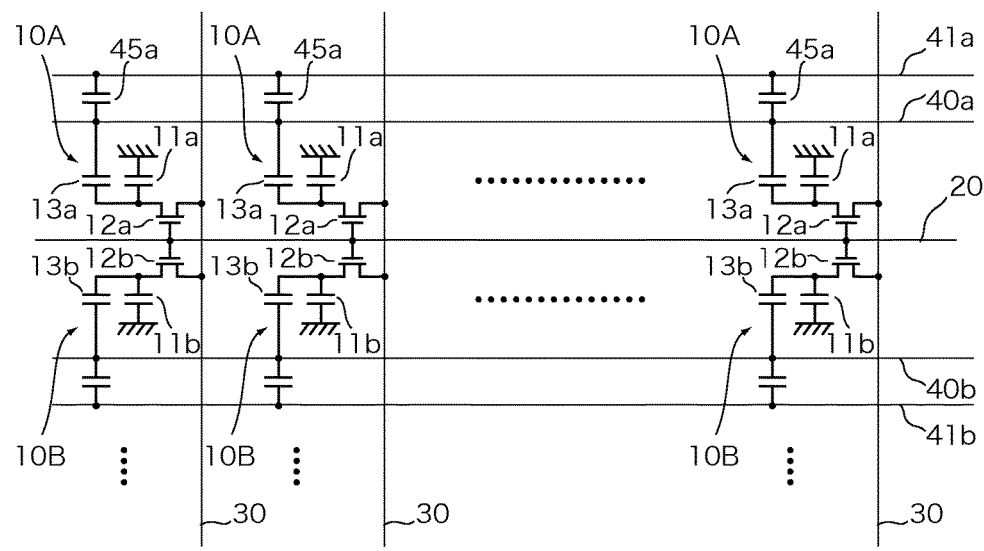
FIG. 7 is a schematic view illustrating an equivalent circuit of each pixel according to Embodiment 2.

FIG. 7 is a schematic view illustrating equivalent circuits of each pixel 10 according to Embodiment 2. In Embodiment 2, each pixel 10 has a configuration including two sub-pixels 10A and 10B. Similar to the pixel 10 illustrated in Embodiment 1, the sub-pixel 10A may be represented using a liquid crystal capacitor 11a, a TFT 12a, and an auxiliary capacitor 13a. Further, the sub-pixel 10B is similar thereto, and the sub-pixel 10B may be represented using a liquid crystal capacitor 11b, a TFT 12b, and an auxiliary capacitor 13b.

In one sub-pixel 10A, the gate terminal of the TFT 12a is connected to the gate wiring 20, and the source terminal of the TFT 12a is connected to the source wiring 30. The drain terminal of the TFT 12a is connected to one end side of the liquid crystal capacitor 11a, and the other end side (counter electrode) of the liquid crystal capacitor 11a is grounded. Further, in Embodiment 2, the auxiliary capacitor 13a is arranged in parallel to the liquid crystal capacitor 11a, and the auxiliary capacitors 13a, 13a, . . . in the row direction are connected to one auxiliary capacitor main wiring 40a.

Similarly, in the other sub-pixel 10B, a gate terminal of the TFT 12b is connected to a gate wiring 20 common with the TFT 12a, and a source terminal of the TFT 12b is connected to the source wiring 30 common with the TFT 12a. A drain terminal of the TFT 12b is connected to one end side of the liquid crystal capacitor 11b, and the other end side (counter electrode) of the liquid crystal capacitor 11b is grounded. Further, in Embodiment 2, the auxiliary capacitor 13b is arranged in parallel to the liquid crystal capacitor 11b, and the auxiliary capacitors 13b, 13b, . . . in the row direction are connected to an auxiliary capacitor main wiring 40b aside from the auxiliary capacitor main wirings 40a.

The TFTs 12a and 12b are applied with the control voltage line-sequentially supplied from the gate driver 2 through the gate wiring 20, thereby being controlled to be turned on/off. The signal voltages supplied from the source driver 3 through each source wiring 30 are respectively applied to the liquid crystal capacitors 11b within the turn on period of the TFTs 12a and 12b. By controlling the magnitude of signal voltage applied to each of the liquid crystal capacitors 11a and 11b, it is possible to control the light transmittance (display luminance of each sub-pixel 10A and 10B) of the liquid crystal layer in the respective sub-pixels 10A and 10B.

Further, in Embodiment 2, the applied voltages supplied from the voltage applying circuit 4 through the auxiliary capacitor main wirings 40a and 40b are applied to each of the auxiliary capacitors 13a and 13b connected to the auxiliary capacitor main wirings 40a and 40b. The auxiliary capacitor main wirings 40a and 40b are respectively connected to the auxiliary capacitor sub-wirings 41a and 41b by the electro-static coupling. The auxiliary capacitor sub-wirings 41a and 41b are applied with the voltage having a polarity reverse to that of the applied voltage supplied from the auxiliary capacitor main wirings 40a and 40b, such that the auxiliary capacitor main wirings 40a and 40b may respectively receive a charge flowed therein from the auxiliary capacitor sub-wirings 41a and 41b through the capacitors 45a and 45b, and to thus hold a potential (voltage waveform) of the auxiliary capacitor main wirings 40a and 40b.

Further, FIG. 7 illustrates the electro-static coupling of the auxiliary capacitor main wirings 40a and 40b with the auxiliary capacitor sub-wirings 41a and 41b as capacitive coupling, but these wirings may be coupled with each other by capacitance and resistance. In addition, the voltage values of the applied voltage supplied from the auxiliary capacitor main wirings 40a and 40b may be equal to each other, or may be different from each other.

Embodiment 3

Embodiment 2 has the configuration in which the voltage applying circuit 4 supplies the applied voltage to each of the auxiliary capacitor main wirings 40a and 40b, and supplies the applied voltage having a reverse polarity to each of the auxiliary capacitor sub-wirings 41a and 41b, but a configuration in which trunk lines commonly connected to the auxiliary capacitor main wirings 40a and 40b and the auxiliary capacitor sub-wirings 41a and 41b are provided, and the applied voltages to be applied to the auxiliary capacitor main wirings 40a and 40b and the auxiliary capacitor sub-wirings 41a and 41b are supplied through the trunk lines may be allowed.

Figure 8:
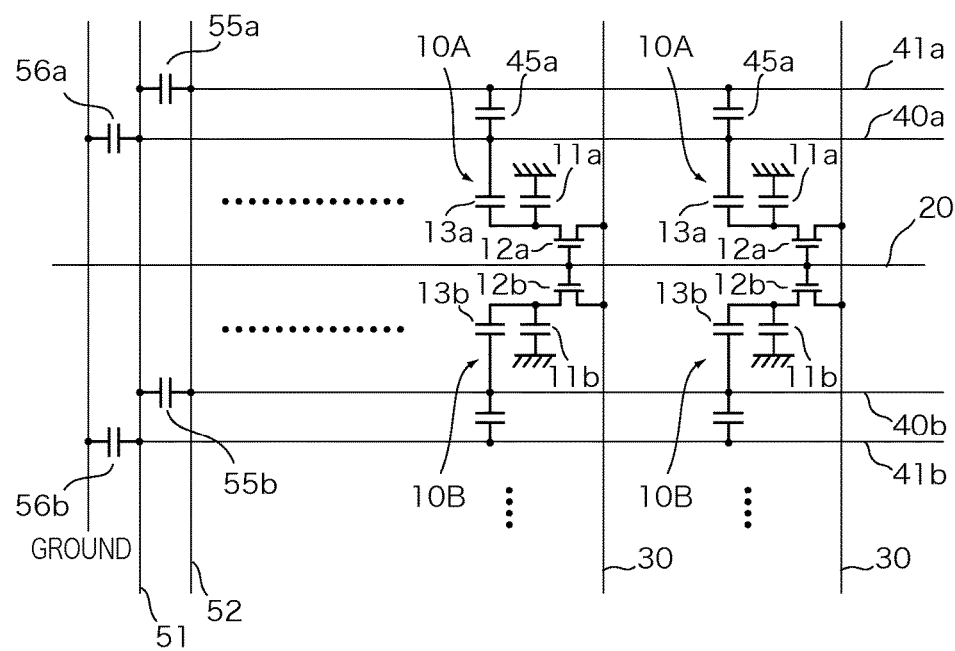
FIG. 8 is a schematic view illustrating an equivalent circuit of each pixel according to Embodiment 3.

FIG. 8 is a schematic view illustrating equivalent circuits of each pixel 10 according to Embodiment 3. In Embodiment 3, similar to Embodiment 2, each pixel 10 has a configuration including two sub-pixels 10A and 10B. The sub-pixel 10A may be represented using a liquid crystal capacitor 11a, a TFT 12a, and an auxiliary capacitor 13a. Further, the sub-pixel 10B may be represented using a liquid crystal capacitor 11b, a TFT 12b, and an auxiliary capacitor 13b.

In one sub-pixel 10A, the gate terminal of the TFT 12a is connected to the gate wiring 20, and the source terminal of the TFT 12a is connected to the source wiring 30. The drain terminal of the TFT 12a is connected to one end side of the liquid crystal capacitor 11a, and the other end side (counter electrode) of the liquid crystal capacitor 11a is grounded. Further, in Embodiment 3, the auxiliary capacitor 13a is arranged in parallel to the liquid crystal capacitor 11a, and the auxiliary capacitors 13a, 13a, . . . in the row direction are connected to one auxiliary capacitor main wiring 40a.

Similarly, in the other sub-pixel 10B, a gate terminal of the TFT 12b is connected to a gate wiring 20 common with the TFT 12a, and a source terminal of the TFT 12b is connected to the source wiring 30 common with the TFT 12a. A drain terminal of the TFT 12b is connected to one end side of the liquid crystal capacitor 11b, and the other end side (counter electrode) of the liquid crystal capacitor 11b is grounded. Further, in Embodiment 3, the auxiliary capacitor 13b is arranged in parallel to the liquid crystal capacitor 11b, and the auxiliary capacitors 13b, 13b, . . . in the row direction are connected to an auxiliary capacitor main wiring 40b aside from the auxiliary capacitor main wirings 40a.

The TFTs 12a and 12b are applied with the control voltage line-sequentially supplied from the gate driver 2 through the gate wiring 20, thereby being controlled to be turned on/off. The signal voltages supplied from the source driver 3 through each source wiring 30 are respectively applied to the liquid crystal capacitors 11b within the turn on period of the TFTs 12a and 12b. By controlling the magnitude of signal voltage applied to each of the liquid crystal capacitors 11a and 11b, it is possible to control the light transmittance (display luminance of each sub-pixel 10A and 10B) of the liquid crystal layer in the respective sub-pixels 10A and 10B.

Further, Embodiment 3 includes a first auxiliary capacitor trunk line 51 and a second auxiliary capacitor trunk line 52 which are connected to the voltage applying circuit 4. In addition, the auxiliary capacitor main wiring 40a included in the sub-pixel 10A is connected to the first auxiliary capacitor trunk line 51, and the auxiliary capacitor sub-wiring 41a is connected to the second auxiliary capacitor trunk line 52.

Further, the auxiliary capacitor main wiring 40b included in the sub-pixel 10B is connected to the second auxiliary capacitor trunk line 52, and the auxiliary capacitor sub-wiring 41b is connected to the first auxiliary capacitor trunk line 51.

The first auxiliary capacitor trunk line 51 and the second auxiliary capacitor trunk line 52 are electro-statically coupled to each other through capacitors 55a and 55b. Further, the first auxiliary capacitor trunk line 51 is electro-statically coupled to a ground through capacitors 56a and 56b provided therebetween, and the first auxiliary capacitor trunk line 51 and the second auxiliary capacitor trunk line 52 form a balanced wiring.

In the above-described circuit configuration, the voltage applying circuit 4 may apply the voltages having polarities reverse to each other (voltage waveforms are substantially opposite to each other), by applying the voltages having polarities reverse to each other (voltage waveforms are substantially opposite to each other) to the first auxiliary capacitor trunk line 51 and the second auxiliary capacitor trunk line 52, and by using the auxiliary capacitor main wiring 40a connected to the auxiliary capacitor 13a included in the sub-pixel 10A and the auxiliary capacitor sub-wiring 41a statically coupled to the and the auxiliary capacitor main wiring 40b, and may apply the voltage having a substantially constant value to each auxiliary capacitor 13a of the sub-pixel 10A arranged in the row direction. Further, the sub-pixel 10B is similar thereto, and the voltage applying circuit 4 may apply the voltages having polarities reverse to each other (voltage waveforms are substantially opposite to each other) by using the auxiliary capacitor main wiring 40b connected to the auxiliary capacitor 13b included in the sub-pixel 10B and the auxiliary capacitor sub-wiring 41b statically coupled to the auxiliary capacitor main wiring 40b, and may apply the voltage having a substantially constant value to each auxiliary capacitor 13b of the sub-pixel 10B arranged in the row direction.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other, and new technical features may be formed by the combination.

The invention claimed is:

1. A display apparatus comprising:
   a plurality of display elements;
   signal lines which supply a signal voltage to be applied to the display elements;
   switching elements which are provided corresponding to each of the display elements and are configured to control conduction/non-conduction between the display elements and the signal lines by opening and closing;
   scanning lines configured to supply a control voltage to control the opening and closing of the switching elements;
   a plurality of auxiliary capacitor parts connected to each of the display elements;
   main wirings configured to connect directly to an electrode of the auxiliary capacitor parts so as to supply a first alternating voltage to be applied to the auxiliary capacitor parts;

one or a plurality of sub-wirings electro-statically coupled to the main wirings in which the sub-wirings are not connected to the electrode of the auxiliary capacitor parts directly; and a unit configured to apply the first alternating voltage to be applied to the auxiliary capacitor parts to the main wirings, and apply a second alternating voltage to be applied to the one or plurality of sub-wirings in which the second alternating voltage has a polarity reverse to that of the first alternating voltage.

2. The display apparatus according to claim 1, wherein the display element includes a plurality of sub-pixels, each of the sub-pixels in each of the display elements includes a switching element connected to one scanning line, the display element connected to the switching element, and the auxiliary capacitor part connected to the display element, and each of the auxiliary capacitor parts included in the sub-pixels in each of the display elements is provided with the main wirings and the sub-wirings.

3. The display apparatus according to claim 2, further comprising:

a first trunk line configured to supply an alternating voltage; and a second trunk line configured to supply an alternating voltage having a polarity reverse to that of the alternating voltage supplied by the first trunk line, wherein one of the main wirings and the sub-wirings provided in each of the auxiliary capacitor parts included in each of the sub-pixels is connected to the first trunk line, and the other one thereof is connected to the second trunk line.

4. The display apparatus according to claim 1, wherein the sub-wirings are electro-statically coupled to the main wirings through a capacitor.

5. The display apparatus according to claim 3, wherein the first trunk line and the second trunk line are electro-statically coupled to each other through a capacitor.

* * * * *